Sept. 6, 1938.   J. EGGERT ET AL   2,129,205
MANUFACTURE OF LENTICULAR PRINTS
Filed Jan. 3, 1935   2 Sheets-Sheet 1

Inventors:
John Eggert,
Gerd Heymer,
By Attorneys
Potter, Pierce & Scheffler.

Fig. 5
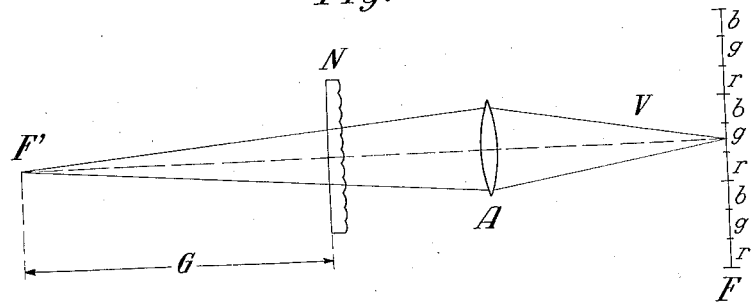
Fig. 6
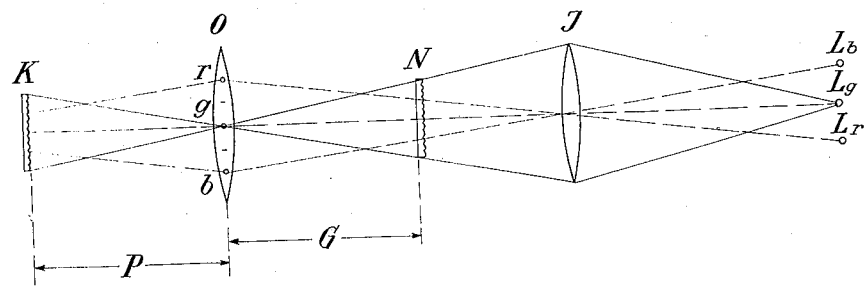
Fig. 7
Fig. 8
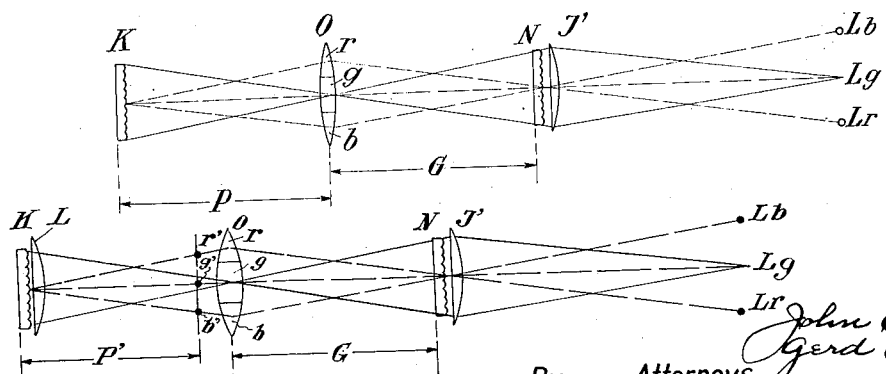

Patented Sept. 6, 1938

2,129,205

UNITED STATES PATENT OFFICE 2,129,205

MANUFACTURE OF LENTICULAR PRINTS

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application January 3, 1935, Serial No. 272
In Germany January 9, 1934

4 Claims. (Cl. 88—24)

Our present invention relates to the manufacture of lenticular prints and more particularly to the manufacture of lenticular prints wherein projection printing is used.

One of its objects is to provide an improved process of manufacturing lenticular prints. Further objects will be seen from the detailed specification following hereafter.

Reference is made to the accompanying drawings in which

Fig. 5 shows an arrangement for exposing a lenticular film with the aid of a multi-color filter with repetition of the color sequence; and Figs. 6, 7 and 8 show arrangements for printing in accordance with the invention.

Figure 1:
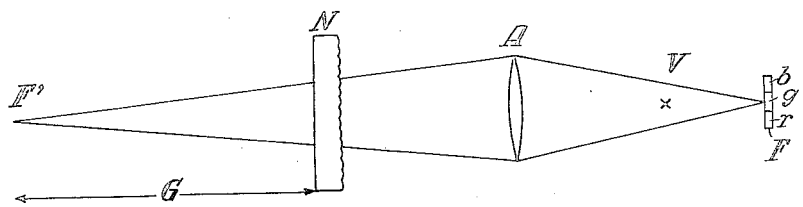
Fig. 1 shows the condition in exposing a lenticular film according to this invention.

In application Ser. No. 446,323, filed April 22, 1930 and matured into Patent No. 1,915,418, Gerd Heymer, one of the inventors of the present application, has described a process for printing a lenticular film on another lenticular film by illuminating the negative film through the embossed side.

This process is connected with the drawback that a printing objective of very large aperture must be used. In the co-pending application Ser. No. 636,056, filed October 3, 1932, Gerd Heymer has described a process which permits the use of a printing objective with a smaller aperture by inserting a convex lens in the trace of the rays directly behind the negative.

According to the present invention we have found a process which permits the omission of the aforesaid convex lens and simultaneously permits the use of a printing objective that must not have a very large aperture. This is attained by photographing the object under such conditions on a lenticular film that the filter middle lines that is to say the rays from the middle of the filter to the middle of the lenticular elements, intersect in a plane on the emulsion side of the film, and illuminating the original through the embossed side under the same conditions which prevailed during exposure as regards the trace of the rays. As a source of light there is used one which operates under local separation of the colors, for instance, a diaphragm having illuminated apertures arranged in the form of steps, so that a line drawn in a direction perpendicular to the direction of the lenticular elements through any point of the diaphragm cuts only one aperture corresponding with a filter strip of the taking filter, or an illuminating device as described in the co-pending application Ser. No. 634,070, filed Sept. 20, 1932 by Gerd Heymer, and in which there are used a plurality of lamps arranged in the plane that would be occupied by the multi-color filter or its virtual image in the form of steps. Printing is thus effected that the point of intersection of the filter middle lines in exposure lies within the diaphragm of the printing objective which projects the image of the original film on the printing film. If the print shall be projected with another filter distance than that which is fixed by the aforesaid condition a concave or a convex lens may be inserted directly over the printing film which projects the point of intersection of the filter middle lines which is determinative for obtaining the correct color values to the required distance, or generically expressed: the point of intersection of the filter middle lines with relation to the printing objective may be selected in such a manner that its apparent distance from the printing film corresponds with the required distance of the projection filter always subject to the condition that the distance of this point from the original corresponds with its distance from the original in exposure.

Inasmuch as the filter must be arranged at a relatively large distance from the objective in exposure, that is to say at a distance greater than the focal length of the objective, an objective of very large aperture must be used in order that no vignetting takes place. However, it has been found that an objective of large aperture can be avoided if use is made of a filter with repetition of the color areas, i. e., a filter the simple color sequence of which, red, green, blue is repeated entirely or partially in corresponding sequence on both sides of the middle group. The size of the exposure filter is such that the image of a color series red, green, blue projected on the emulsion layer behind each lenticular element has exactly the width of one lenticular element. In order, when exposing the original film, to ensure completely uniform illumination of the picture field, a mask of a certain shape may be inserted in the vicinity of the objective. This mask consists of one or more rectangular pieces, all pieces of the same size having together such a width that, seen from the picture field, only a whole multiple of a color sequence red, green, blue is allowed to pass.

The process may, of course, also be applied to other combinations of filters, for example to the filter for the lenticular bi-pack, i. e., a bi-pack consisting of a lenticular front film and an ordinary back film, as described in the application Ser. No. 608,829, filed May 2, 1932 by Gerd Heymer, and matured into Patent No. 1,968,944. In one modification the filter consists of a purple and a yellow filter strip. In this case the color strip sequence yellow, purple, takes the place of the color strip sequence red, green, blue mentioned above by way of example.

The invention will now be further explained with reference to the accompanying drawings:

Fig. 1 illustrates first of all the production of a printing film to be used in accordance with the invention. N is the original film, A the exposure objective with the front focal point V. At F is placed the exposure filter. F' is the plane conjugate with plane F and at a distance G from the film.

Figure 2:
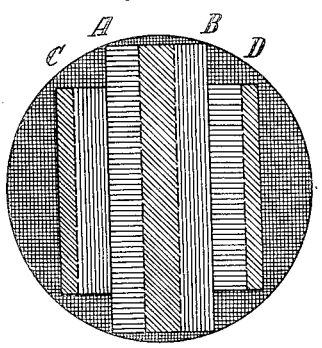
Figs. 2 and 3 show filters for use in accordance with the invention.
Figure 3:
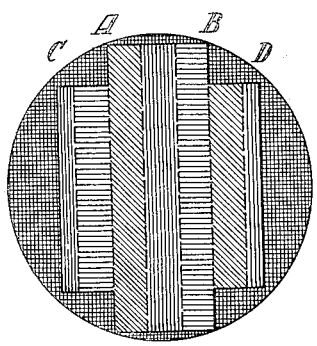

Figs. 2 and 3 illustrate examples of the shape of the repetition color filter and the diaphragm. Fig. 2 is a view of the filter as seen from the middle of the picture field. The middle portion of the breadth AB of the diaphragm allows just the middle group of the repetition filter to pass. To this middle portion of the diaphragm, for the purpose of further utilization of the objective towards both sides, there are added portions of the width CA and BD, namely in such a manner that AC+BD=AB. In this way agreement of the filter for all points of the picture field is ensured.

Fig. 3 shows the same diaphragm seen from a lateral point of the picture field. It will be recognized that the relation of the three colors has remained unchanged, although the arrangement of the strips is not the same as in Fig. 2.

Figure 4:
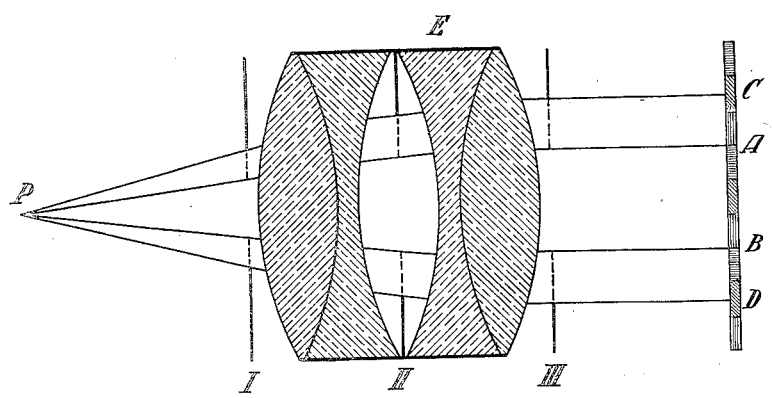
Fig. 4 shows some possibilities of arranging the diaphragm with relation to the objective and the multi-color filter.

Fig. 4 illustrates various possible ways of arranging the diaphragm and the corresponding widths. ABCD is the repetition filter, E an objective. Until striking the objective, the rays are practically parallel and thence converge with an inclination, which varies with the construction of the objective, until they meet at the picture point P. In the case illustrated, the construction of the objective allows only two color sequences red, green, blue to pass simultaneously. The marginal portions of the diaphragm must therefore be shorter, as in Figs. 2 and 3. Now, as may be seen from Fig. 4, the width of the diaphragm aperture must vary according to whether the diaphragm is placed in position I, II or III. However, in certain circumstances in cases in which the number of the strips or the number of the filter units red, green, blue which can be used when the objective is full open, is larger, the diaphragm may be omitted without impairing the balance of the colors to any considerable extent.

Fig. 5 illustrates the arrangement of a repetition filter in which there is no fundamental alteration of the course of ray as compared with a filter with a simple color sequence. Here also, N is the original film, A the exposure objective with the focal point V: the repetition filter is arranged at F. The plane F' is conjugate with the plane F. Its distance from the original=G.

Fig. 6 illustrates diagrammatically the arrangement in the printing process. Here again N is the original film, O the objective which projects the original N on to the printing film K. Now in order that the filter image of N may be located just in the vicinity of the objective O or within the objective, the distance of the exposure filter in the production of the original film N, must be selected so that the value G shown in Figs. 1 and 5, is equal to the distance G between O and N during printing. The source of light is arranged opposite the lenticular embossing of the original N, namely, either, in accordance with U. S. Patent 1,915,418, there must be arranged a diaphragm system, or, in accordance with the co-pending application Ser. No. 634,070, filed Sept. 20, 1932 by Gerd Heymer, there must be arranged a step-shaped source of light in such a manner that it is conjugate with F'. For this purpose the source of light is arranged at $L_b$, $L_g$, $L_r$ and projected on the film N by means of the lens or lens system J.

Fig. 7 shows a modified printing arrangement. In this case in the arrangement shown in Fig. 6 the lens or lens system J arranged between the film N and the source of light $L_b$, $L_g$, $L_r$ is replaced by lens or lens system J' arranged directly over the original N and focusing the source of light in the vicinity of the objective O or within this objective.

Fig. 8 shows the same printing arrangement as it is shown in Fig. 7 with the modification that a convex lens L has been placed directly over the printing film K, so that the filter image r, g, b is displaced to r', g', b' at the distance P' from the printing film. Therefore, the multi-color filter for projecting the print must also be arranged at the distance P'.

What we claim is:

1. A process of manufacturing lenticular prints which comprises exposing a lenticular film through a multi-color filter arranged at a distance from the taking objective greater than the focal length of said taking objective so that the middle filter lines intersect in a plane on the emulsion side of said lenticular, illuminating the original film thus taken through the embossed side under the same conditions as prevailed in exposure as regards the trace of the rays and under local separation of the colors, projecting the point of intersection of the filter middle lines at the same distance from the original film as said point had from the film in exposure, projecting the original on a lenticular printing film arranged with its lenticular elements facing the emulsion side of said original, and displacing the point of intersection of the filter middle lines with relation to the printing film to the distance required for the projection filter.

2. A process of manufacturing lenticular prints which comprises exposing a lenticular film through a multi-color filter with repetition of the sequence of color strips arranged at a distance from the taking objective greater than the focal length of said taking objective so that the filter middle lines intersect in a plane on the emulsion side of said lenticular film, illuminating the original film thus taken through the embossed side under the same conditions as prevailed in exposure as regards the trace of the rays and under local separation of the colors, projecting the point of intersection of the filter middle lines at the same distance from the original film as said point had from the film in exposure, projecting the original on a lenticular printing film arranged with its lenticular elements facing the emulsion side of said original, and displacing the point of intersection of the filter middle lines with relation to the printing film to the distance required for the projection filter.

3. A process of manufacturing lenticular prints which comprises exposing a lenticular film through a multi-color filter with repetition of the sequence of color strips arranged at a distance from the taking objective greater than the focal length of said taking objective so that the filter middle lines intersect in a plane on the emulsion side of said lenticular film, masking the rays during exposure so that at least one sequence of color strips is visible when viewed from the film while avoiding vignetting, illuminating the original film thus taken through the embossed side under the same conditions as prevailed in exposure as regards the trace of the rays and under local separation of the colors, projecting the point of intersection of the filter middle lines at the same distance from the original film as said point had from the film in exposure, projecting the original on a lenticular printing film arranged with its lenticular elements facing the emulsion side of said original, and displacing the point of intersection of the filter middle lines with relation to the printing film to the distance required for the projection filter.

4. A process of manufacturing lenticular prints which comprises exposing a lenticular film through a multi-color filter with repetition of the sequence of color strips arranged at a distance from the taking objective so that the filter middle lines intersect in a plane on the emulsion side of said lenticular film, masking the rays during exposure so that sequences of color strips are visible when viewed from the film which sequences have different lengths and the same breadth and the strips forming one sequence having the same length while avoiding vignetting, illuminating the original film thus taken through the embossed side under the same conditions as prevailed in exposure as regards the trace of the rays and under local separation of the colors, projecting the point of intersection of the filter middle lines at the same distance from the original film as said point had from the film in exposure, projecting the original on a lenticular printing film arranged with its lenticular elements facing the emulsion side of said original, and displacing the point of intersection of the filter middle lines with relation to the printing film to the distance required for the projection filter.

JOHN EGGERT.
GERD HEYMER.